United States Patent
Chopra et al.

(10) Patent No.: US 11,914,464 B2
(45) Date of Patent: Feb. 27, 2024

(54) METHOD AND SYSTEM FOR PREDICTING USER INVOLVEMENT REQUIREMENTS FOR UPGRADE FAILURES

(71) Applicant: EMC IP Holding Company LLC, Hopkinton, MA (US)

(72) Inventors: Shelesh Chopra, Bangalore (IN); Parminder Singh Sethi, Punjab (IN); Anannya Roy Chowdhury, Jharkhand (IN); Rahul Vishwakarma, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/192,942

(22) Filed: Mar. 5, 2021

(65) Prior Publication Data

US 2022/0283890 A1    Sep. 8, 2022

(51) Int. Cl.
  *G06F 11/00*    (2006.01)
  *G06F 11/07*    (2006.01)
  *G06N 20/00*    (2019.01)

(52) U.S. Cl.
  CPC ...... *G06F 11/0793* (2013.01); *G06F 11/0709* (2013.01); *G06F 11/079* (2013.01); *G06F 11/0751* (2013.01); *G06N 20/00* (2019.01)

(58) Field of Classification Search
  CPC ............. G06F 11/0793; G06F 11/0709; G06F 11/0751; G06F 11/079; G06F 11/0706; G06F 11/0703
  See application file for complete search history.

(56) References Cited

U.S. PATENT DOCUMENTS 11,150,972 B1 * 10/2021 Cheruiyot ........... G06F 11/0793
2021/0374567 A1 * 12/2021 Bhimireddy ........ G06F 11/3495

OTHER PUBLICATIONS

Bott, Windows 10 upgrade failed? Use these 5 tools to find the problem and fix it fast, Mar. 22, 2020, https://www.zdnet.com/, 21 pages. (Year: 2020).*

* cited by examiner

*Primary Examiner* — Katherine Lin
(74) *Attorney, Agent, or Firm* — Chamberlain, Hrdlicka, White, Williams & Aughtry; Aly Z. Dossa

(57) ABSTRACT

A method for managing upgrades of components of clients includes obtaining an upgrade failure prediction request associated with a client of the clients, and in response to obtaining an update failure prediction request: obtaining live data associated with the client, matching the live data with a training data cluster, selecting relevant features associated with processed training data of the training data cluster, generating an upgrade failure prediction using the live data associated with the relevant features and a prediction model, making a determination that the upgrade failure prediction implicates an action is required, and based on the determination, initiating performance of the action.

20 Claims, 13 Drawing Sheets

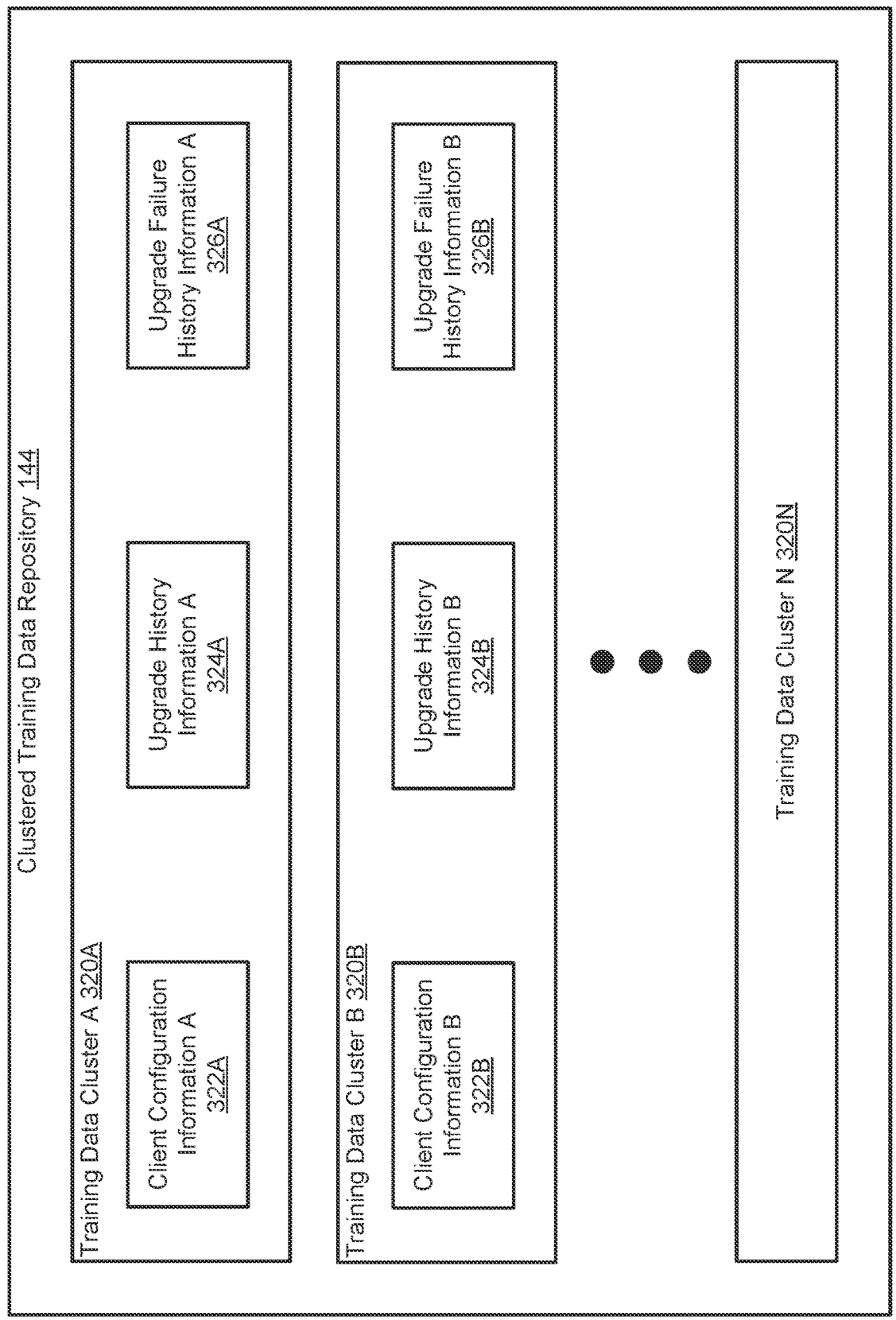

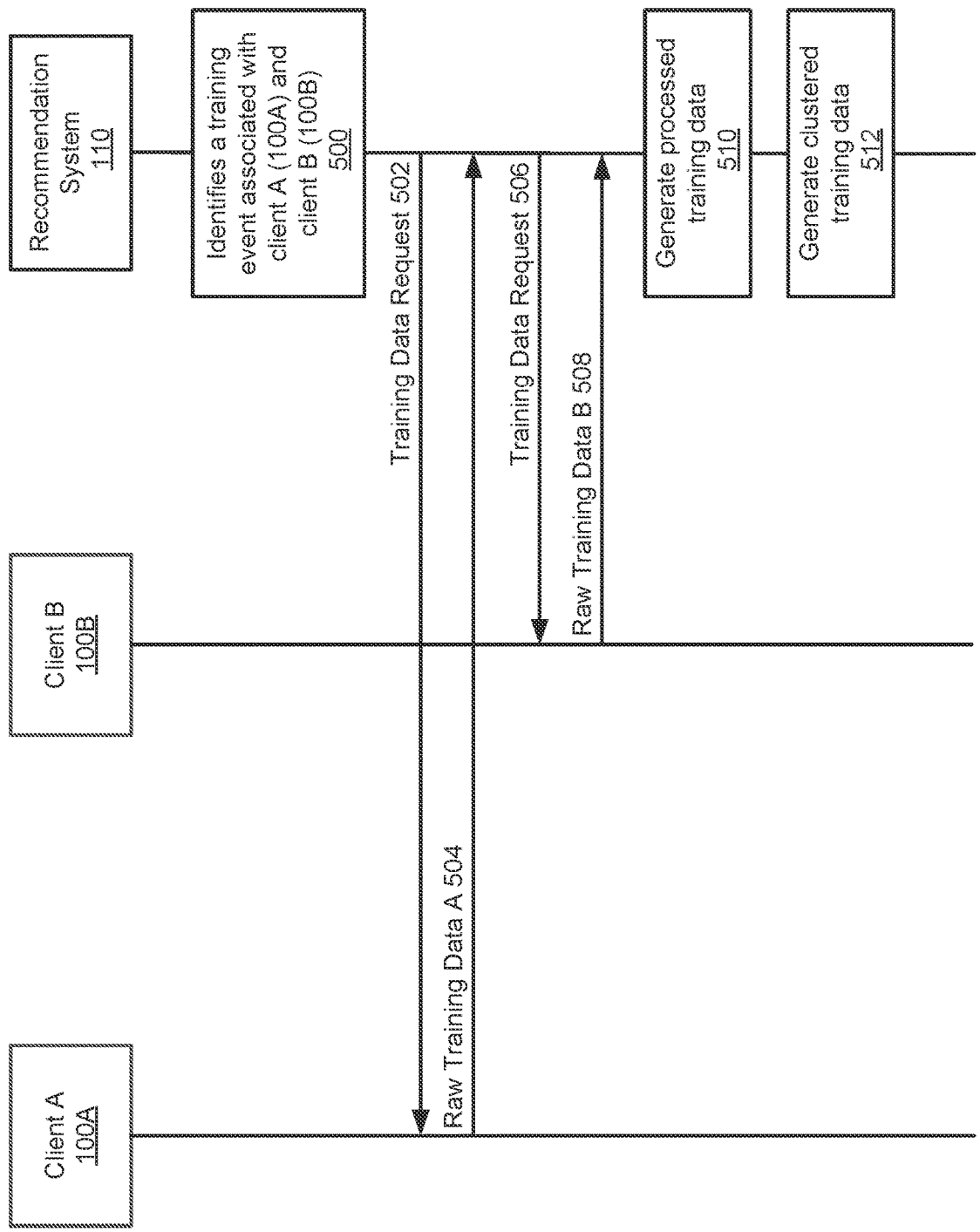

Example Clustered Training Data Repository 530

Training Data Cluster A 532A

| | | | | | |
|---|---|---|---|---|---|
| Client A | Failure Date A | Failure Cause A | Application A | Upgrade Type A | Tech Support Required | Z-Score A 1.35 |
| Client A | Failure Date B | Failure Cause B | Application A | Upgrade Type B | Tech Support Not Required | Z-Score B 0.51 |
| Client A | Failure Date C | Failure Cause C | Application B | Upgrade Type C | Tech Support Not Required | Z-Score C 0.76 |
| Client A | Failure Date D | Failure Cause D | Application B | Upgrade Type B | Tech Support Required | Z-Score D 1.39 |

Training Data Cluster B 532B

| | | | | | |
|---|---|---|---|---|---|
| Client B | Failure Date E | Failure Cause E | Application C | Upgrade Type A | Tech Support Not Required | Z-Score E 0.43 |
| Client B | Failure Date F | Failure Cause F | Application C | Upgrade Type B | Tech Support Required | Z-Score F 1.64 |
| Client B | Failure Date G | Failure Cause G | Application D | Upgrade Type C | Tech Support Not Required | Z-Score G 0.76 |
| Client B | Failure Date H | Failure Cause H | Application D | Upgrade Type B | Tech Support Required | Z-Score H 1.39 |

FIG. 5E

METHOD AND SYSTEM FOR PREDICTING USER INVOLVEMENT REQUIREMENTS FOR UPGRADE FAILURES

BACKGROUND

Computing devices may provide services. To provide the services, the computing devices may include hardware components and software components. The services provided by the computing devices may be limited by these components. To improve the services, the components may be upgraded.

SUMMARY

In general, in one aspect, the invention relates to a method for managing upgrades of components of clients in accordance with one or more embodiments of the invention. The method includes obtaining an upgrade failure prediction request associated with a client of the clients, and in response to obtaining an update failure prediction request: obtaining live data associated with the client, matching the live data with a training data cluster, selecting relevant features associated with processed training data of the training data cluster, generating an upgrade failure prediction using the live data associated with the relevant features and a prediction model, making a determination that the upgrade failure prediction implicates an action is required, and based on the determination, initiating performance of the action.

In general, in one aspect, the invention relates to a system for managing upgrades of components of clients in accordance with one or more embodiments of the invention. The system includes persistent storage, which stores raw training data and processed training data, and a recommendation system. The recommendation system is programmed to obtain an upgrade failure prediction request associated with a client of the clients, and in response to obtaining an update failure prediction request: obtain live data associated with the client, match the live data with a training data cluster, select relevant features associated with processed training data of the training data cluster, generate an upgrade failure prediction using the live data associated with the relevant features and a prediction model, make a determination that the upgrade failure prediction implicates an action is required, and based on the determination, initiate performance of the action.

In general, in one aspect, the invention relates to a non-transitory computer readable medium which includes computer readable program code, which when executed by a computer processor enables the computer processor to perform a method for managing upgrades of components of clients in accordance with one or more embodiments of the invention. The method includes obtaining an upgrade failure prediction request associated with a client of the clients, and in response to obtaining an update failure prediction request: obtaining live data associated with the client, matching the live data with a training data cluster, selecting relevant features associated with processed training data of the training data cluster, generating an upgrade failure prediction using the live data associated with the relevant features and a prediction model, making a determination that the upgrade failure prediction implicates an action is required, and based on the determination, initiating performance of the action.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 3C shows a diagram of a clustered training data repository in accordance with one or more embodiments of the invention.

FIGS. 5A-5E show diagrams of the operation of an example system over time in accordance with one or more embodiments of the invention.

DETAILED DESCRIPTION

Figure 1:
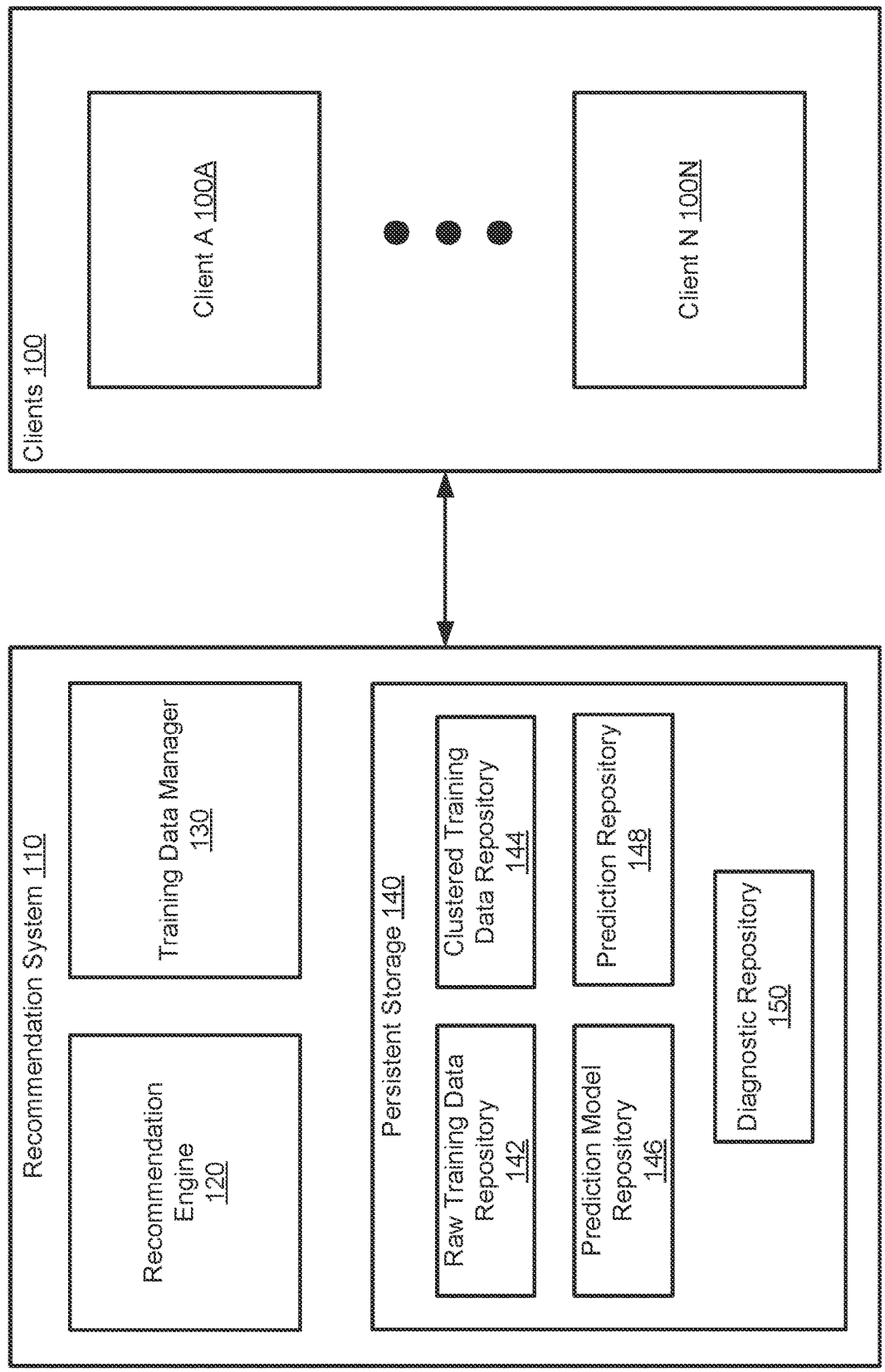
FIG. 1 shows a diagram of a system in accordance with one or more embodiments of the invention.

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

In general, embodiments of the invention relate to systems, devices, and methods for reducing the impact of client component upgrade failures. Specifically, a system in accordance with embodiments of the invention may monitor clients and generate upgrade failure predictions that indicate whether user involvement is required to resolve upgrade failures. The generated predictions may be used to proactively address potential upgrade failures of client components. By doing so, the impact of client component upgrade failures on systems may be reduced.

A system in accordance with embodiments of the invention may generate predictions of future upgrade failure user involvement requirements in a manner that is computationally efficient. To generate the predictions, the system may generate a prediction model by obtaining raw training data from clients, processing the raw training data to obtain processed training data, clustering the processed training data, and generating a prediction model by inputting the processed training data into a classification algorithm. After the prediction model is generated, live data may be obtained from a client associated with a potential upgrade. The live data may be matched with clustered training data to identify relevant features included in the live data. The live data associated with the relevant features may be applied to the prediction model to generate a prediction. The prediction may implicate an action that includes notifying a user that the upgrade failure may or may not require user involvement to resolve the upgrade failure.

FIG. 1 shows a diagram of a system in accordance with one or more embodiments of the invention. The system may include clients (100) that obtain upgrade failure prediction services from a recommendation system (110). The upgrade failure prediction services may include generating upgrade failure predictions for the clients (100) that indicate whether user involvement is required to resolve the upgrade failure. The upgrade failure prediction services may further include initiating actions for the clients (100) based on the predictions. By utilizing such services, data that may be relevant to the clients (100) may be stored in a persistent storage (140) of the recommendation system (110).

Prior to generating predictions, the recommendation system (110) may use a training data manager (130) to obtain training data (i.e., raw training data) associated with the clients (100), store the training data in the persistent storage (140) of the recommendation system (110), and may enable the recommendation engine (120) to access the training data. The recommendation engine may use the training data to generate prediction models that may also be stored in persistent storage (140). The recommendation engine (120) may generate any number of prediction models without departing from the invention. The generated predictions may indicate whether user involvement is required to resolve an upgrade failure.

The components of the system illustrated in FIG. 1 may be operably connected to each other and/or operably connected to other entities (not shown) via any combination of wired and/or wireless networks. Each component of the system illustrated in FIG. 1 is discussed below.

The clients (100) may be implemented using computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 4A-4B. The clients (100) may be implemented using other types of computing devices without departing from the invention. For additional details regarding computing devices, refer to FIG. 6.

The clients (100) may be implemented using logical devices without departing from the invention. For example, the clients (100) may include virtual machines that utilize computing resources of any number of physical computing devices to provide the functionality of the clients (100). The clients (100) may be implemented using other types of logical devices without departing from the invention.

In one or more embodiments of the invention, the clients (100) include client components (not shown) that provide computer implemented services to users. The computer implemented services may include, for example, database services and/or any other computer implemented services without departing from the invention. The client components may include hardware components (e.g., central processing units, graphics processing units, memory, storage devices, etc.) and/or software components (e.g., applications, operating systems, virtual machines, etc.). The client components may be upgraded over time to improve the performance of computer implemented services. The upgrades may include, for example, version upgrades, patch upgrades, and other and/or additional types of upgrades. The upgrades may fail due to authentication issues, application programming interface command timeouts, and other and/or additional purposes without departing from the invention. Some update failures, such as authentication issues (e.g., incorrect authorization credentials) may require user intervention to resolve (e.g., update authorization credentials). Other update failures, such as application programming interface command timeouts, may not require user intervention to resolve the upgrade failure (e.g., retrying the application programming interface command). Obtaining prediction services from the recommendation system (110) may enable clients (100) to proactively address upgrade failures that require user intervention to resolve, thus improving the efficiency of performing upgrades and resolving upgrade failures.

In one or more embodiments of the invention, the clients (100) utilize upgrade failure prediction services provided by the recommendation system (110). Using the upgrade failure prediction services may enable the clients (100) to avoid inefficient use of computing resources to resolve upgrade failures of client components.

To use the upgrade failure prediction services, the clients (100) may perform actions under the directions of the recommendation system (110). By doing so, the recommendation system (110) may orchestrate the transmission of data and actions between the recommendation system (110) and the clients (100).

For example, a client (100) may send data regarding component configurations, upgrade history, and/or previous upgrade failures to the recommendation system (110). The recommendation system (110) may generate prediction models that may generate predictions as to whether or not a failure of an upgrade of a component of a client (100) (or other entity) is likely to require intervention from a user and may not be resolved by the client (100) or another entity.

If it is determined that an upgrade failure is likely to require user intervention, the recommendation system (110) may initiate an action(s) for the client (100) to address the potential failure. For example, the recommendation system (110) may notify the client (100) that a potential upgrade failure is likely to require user intervention to resolve the upgrade failure. The clients (100) may utilize other and/or additional services provided by the recommendation system (110) without departing from the invention.

A system in accordance with one or more embodiments of the invention may include any number of clients (e.g., 100A, 100N) without departing from the invention. For example, a system may include a single client (e.g., 100A) or multiple clients (e.g., 100A, 100N).

In one or more embodiments of the invention, the recommendation system (110) is implemented using a computing device. The computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to perform the functions described in this application and/or all, or a portion, of the methods illustrated in FIGS. 4A-4B. The recommendation system (110) may be implemented using other types of computing devices without departing from the invention. For additional details regarding computing devices, refer to FIG. 6.

The recommendation system (110) may be implemented using logical devices without departing from the invention. For example, the recommendation system (110) may include virtual machines that utilize computing resources of any number of physical computing devices to provide the functionality of the recommendation system (110). The recommendation system (110) may be implemented using other types of logical devices without departing from the invention.

In one or more embodiments of the invention, the recommendation system (110) provides upgrade failure prediction services. Upgrade failure prediction services may include (i) generation of prediction models (146), (ii) generation of predictions for the user involvement to resolve upgrade failures of components of the clients (100), and/or (iii) initiating actions based on the predictions. By doing so, the recommendation system (110) may improve the efficiency of upgrading client components and resolving upgrade failures of client components. The recommendation system (110) may provide other and/or additional services without departing from the invention.

In one or more embodiments of the invention, the recommendation engine (120) is implemented using a computing device. The computing device may be, for example, a mobile phone, tablet, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) cause the computing device to provide the functionality of the recommendation engine (120) described through this application and all, or a portion, of the methods illustrated in FIGS. 4A-4B. The recommendation engine (120) may be implemented using other types of computing devices without departing from the invention. For additional details regarding computing devices, refer to FIG. 6.

In one or more embodiments of the invention, the recommendation engine (120) provides prediction generation services. The prediction generation services may include (i) generating prediction models, (ii) generating processed training data using raw training data, and (iii) generating upgrade failure predictions. The recommendation engine (120) may provide other and/or additional services without departing from the invention. For additional details regarding the recommendation engine (120), refer to FIG. 2.

In one or more embodiments of the invention, the training data manager (130) is implemented using a computing device. The computing device may be, for example, a mobile phone, tablet computer, laptop computer, desktop computer, server, distributed computing system, or a cloud resource. The computing device may include one or more processors, memory (e.g., random access memory), and persistent storage (e.g., disk drives, solid state drives, etc.). The persistent storage may store computer instructions, e.g., computer code, that (when executed by the processor(s) of the computing device) causes the computing device to provide the functionality of the training data manager (130) described through this application. The training data manager (130) may be implemented using other types of computing devices without departing from the invention. For additional details regarding computing devices, refer to FIG. 6.

In one or more embodiments of the invention, the training data manager (130) provides training data management services. Providing training data management services may include obtaining training data from the clients (100) and enabling the recommendation engine (120) to access the obtained training data. The training data manager (130) may provide other and/or additional services without departing from the invention.

In one or more embodiments of the invention, the persistent storage (140) is implemented using a storage device. The storage device may be implemented using physical storage devices and/or logical storage devices. The persistent storage (140) may be implemented using other types of devices that provide data storage services without departing from the invention.

A logical storage device may be an entity that utilizes the physical storage devices of one or more computing devices to provide data storage services. For example, a logical storage may be a virtualized storage that utilizes any quantity of storage resources (e.g., physical storage devices) of any number of computing devices.

A physical storage device may be a physical device that provides data storage services. For example, a physical storage device may include any number of physical devices such as hard disk drives, solid state drives, tape drives, or other types of hardware devices that store data. The physical storage device may include any number of other types of hardware devices for providing data storage services. For example, the physical storage device may include storage controllers that balance and/or allocate storage resources of hardware devices, load balancers that distribute storage workloads across any number of hardware devices, memory for providing cache services for the hardware devices, etc.

In one or more embodiments of the invention, the persistent storage (140) provides data storage services to the recommendation system (110), the recommendation engine (120), the training data manager (130), and/or other entities. The data storage services may include storing of data and providing of previous stored data. The persistent storage (140) may provide other and/or additional services without departing from the invention.

The persistent storage (140) may store data structures including a raw training data repository (142), a clustered training data repository (144), a prediction model repository (146), a prediction repository (148), and a diagnostic repository (150). Each of these data structures are discussed below.

The raw training data repository (142) may be one or more data structures that may include data generated by the clients (100), maintained by the training data manager (130), and utilized by the recommendation engine (120). The raw training data repository (142) may include any quantity of data. The data may include information regarding the components the clients (100). For additional details regarding the raw training data repository (142), refer to FIG. 3A.

The clustered training data repository (144) may be one or more data structures that may include processed training data that has been separated into clusters by the recommendation engine (120). A cluster of training data may be training data that shares one or more characteristics and is, therefore, similar. The clustered training data repository (144) may be used by the recommendation engine (120) to identify relevant features associated with live data obtained from the clients (100). The clustered training data repository may include other and/or additional data and/or information without departing from the invention. For additional details regarding the clustered training data repository (144), refer to FIG. 3C.

The prediction models (146) may be data structures that represent any number of classification prediction models for upgrade failure predictions that may be generated by the recommendation engine (120) and utilized by the recommendation system (110) to generate upgrade failure predictions. The prediction model (146) may be, for example, a classification model generated by applying the processed training data to a classification algorithm. The classification algorithm may be any type of classification without departing from the invention.

The prediction repository (148) may be a data structure that stores predictions generated by the prediction models (146). The prediction repository (148) may store any number of generated predictions. The stored predictions may specify the likelihood that an upgrade failure will require the involvement of a user to resolve the upgrade failure.

The diagnostic repository (150) may be a data structure that stores actions that the recommendation system (110) may cause to be performed. The actions may be associated with different types of predictions that may be generated by the recommendation engine (120). The actions may, for example, include doing nothing if an upgrade failure prediction indicates that an upgrade failure is unlikely to require user involvement, setting a flag to indicate that an upgrade failure will require user involvement to resolve, and/or sending a warning message to indicate that an upgrade failure will require user involvement to resolve. The diagnostic repository (150) may include additional, different, and/or fewer types of actions without departing from the invention.

While the data structures (e.g., 142, 144, 146, 148, 150) are illustrated as separate data structures and have been discussed as including a limited amount of specific information, any of the aforementioned data structures may be divided into any number of data structures, combined with any number of other data structures, and may include additional, less, and/or different information without departing from the invention. Additionally, while illustrated as being stored in the persistent storage (140), any of the aforementioned data structures may be stored in different locations (e.g., in persistent storage of other computing devices and/or spanned across any number of computing devices) without departing from the invention.

Figure 2:
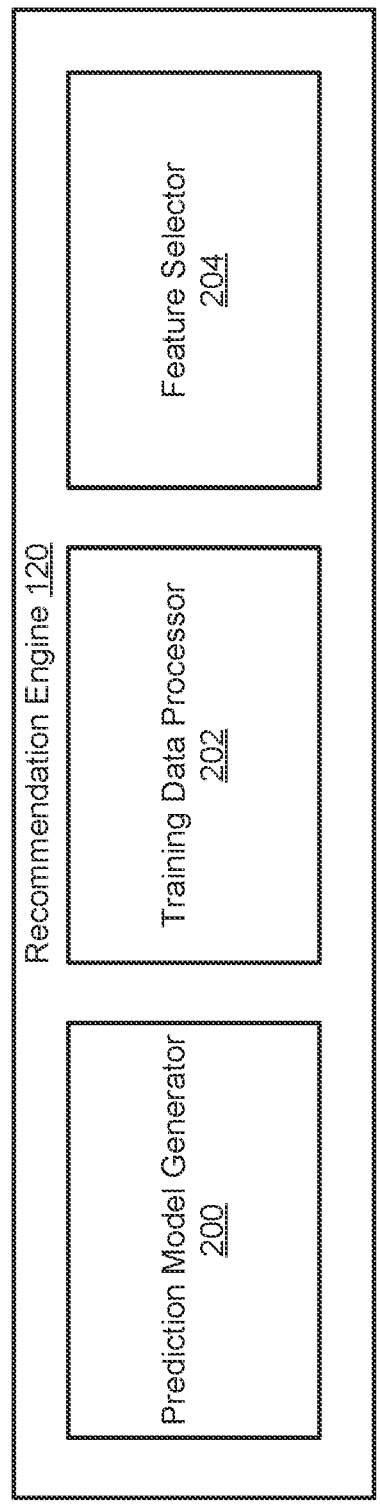
FIG. 2 shows a diagram of a recommendation engine in accordance with one or more embodiments of the invention.

FIG. 2 shows a diagram of a recommendation engine in accordance with one or more embodiments of the invention. The recommendation engine (120) may be similar to the one shown in FIG. 1. As discussed above, the recommendation engine (120) may provide upgrade failure prediction model generation services and upgrade failure prediction generation services for the recommendation system (110, FIG. 1).

To provide the aforementioned functionality of the recommendation engine (120), the recommendation engine may include a prediction model generator (200), a training data processor (202), and a feature selector (204). Each component of the recommendation engine (120) is discussed below.

The prediction model generator (200) may provide prediction model generation services for the recommendation engine (120).

To provide the prediction model generation services, the prediction model generator (200) may obtain the raw baseline training data (300, FIG. 3A) from the training data manager (130, FIG. 1), and use a classification algorithm with the raw baseline training data (300, FIG. 3A) to generate prediction models (146, FIG. 1). The classification algorithm may be a naive Bayesian classification algorithm. The classification algorithm may be other types of classification algorithms without departing from the invention.

The upgrade failure prediction generation services may include obtaining live data from clients (100, FIG. 1) and using the generated prediction model (146, FIG. 1) to generate an upgrade failure prediction. The live data may include data obtained by a client (e.g., 100, FIG. 1) and sent to the recommendation system (110, FIG. 1) at some point in time after the raw training data (300, FIG. 3A) was obtained, sent to the recommendation system (110, FIG. 1), and/or utilized by the recommendation engine (120, FIG. 1). The live data may include the relevant features obtained from the clustered training data.

The live data may include a smaller amount of data than the initially obtained data of the raw baseline training data (300, FIG. 3A) and the raw refinement training data (310, FIG. 3A) (i.e., the training data used to generate improved prediction models). The live data may include data from only a single client (e.g., 100A), not all of the clients (100) that utilize the upgrade failure prediction services.

In one or more embodiments of the invention, the prediction model generator (200) is implemented using a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the prediction model generator (200) described throughout this application and/or all or a portion of the methods illustrated in FIGS. 4A-4B. The prediction model generator (200) may be some other physical device without departing from the invention.

Figure 4A:
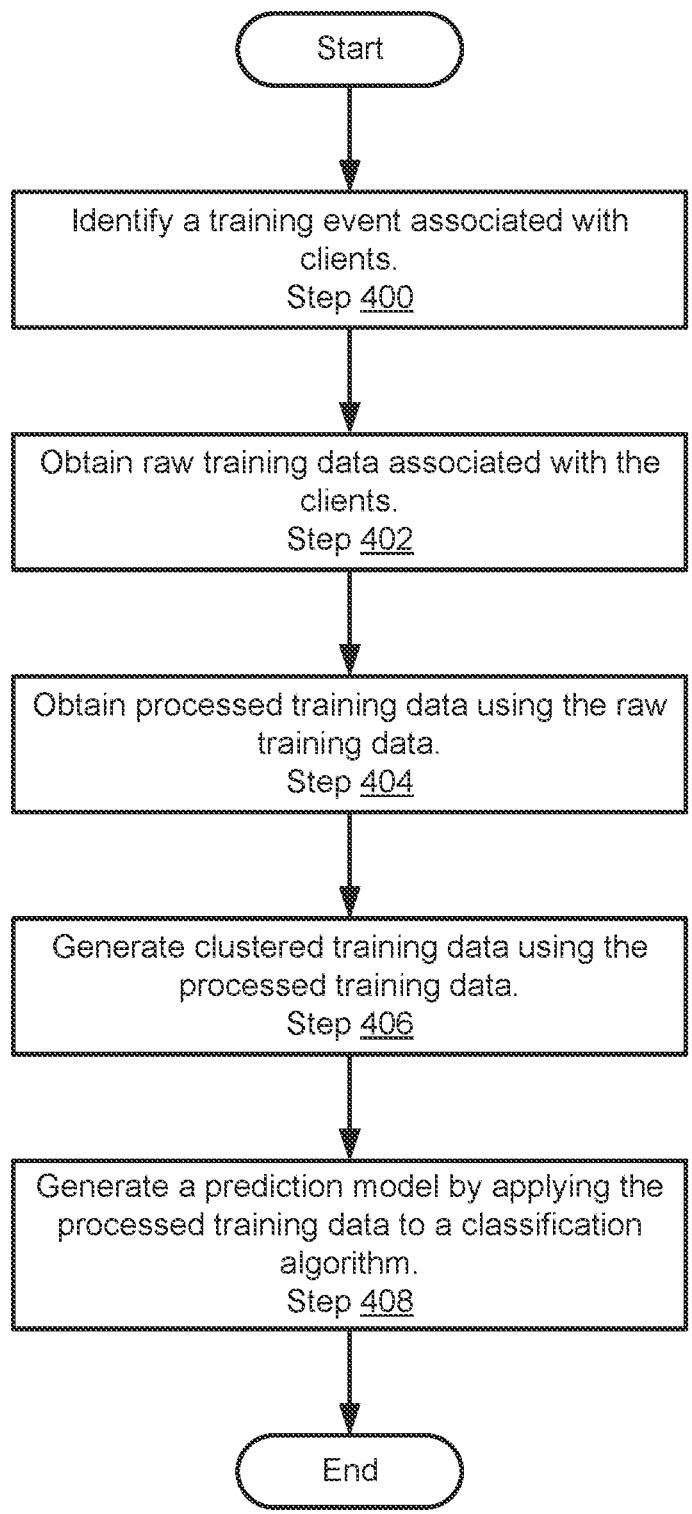
FIG. 4A shows a flowchart of a method of generating a prediction model in accordance with one or more embodiments of the invention.
Figure 4B:
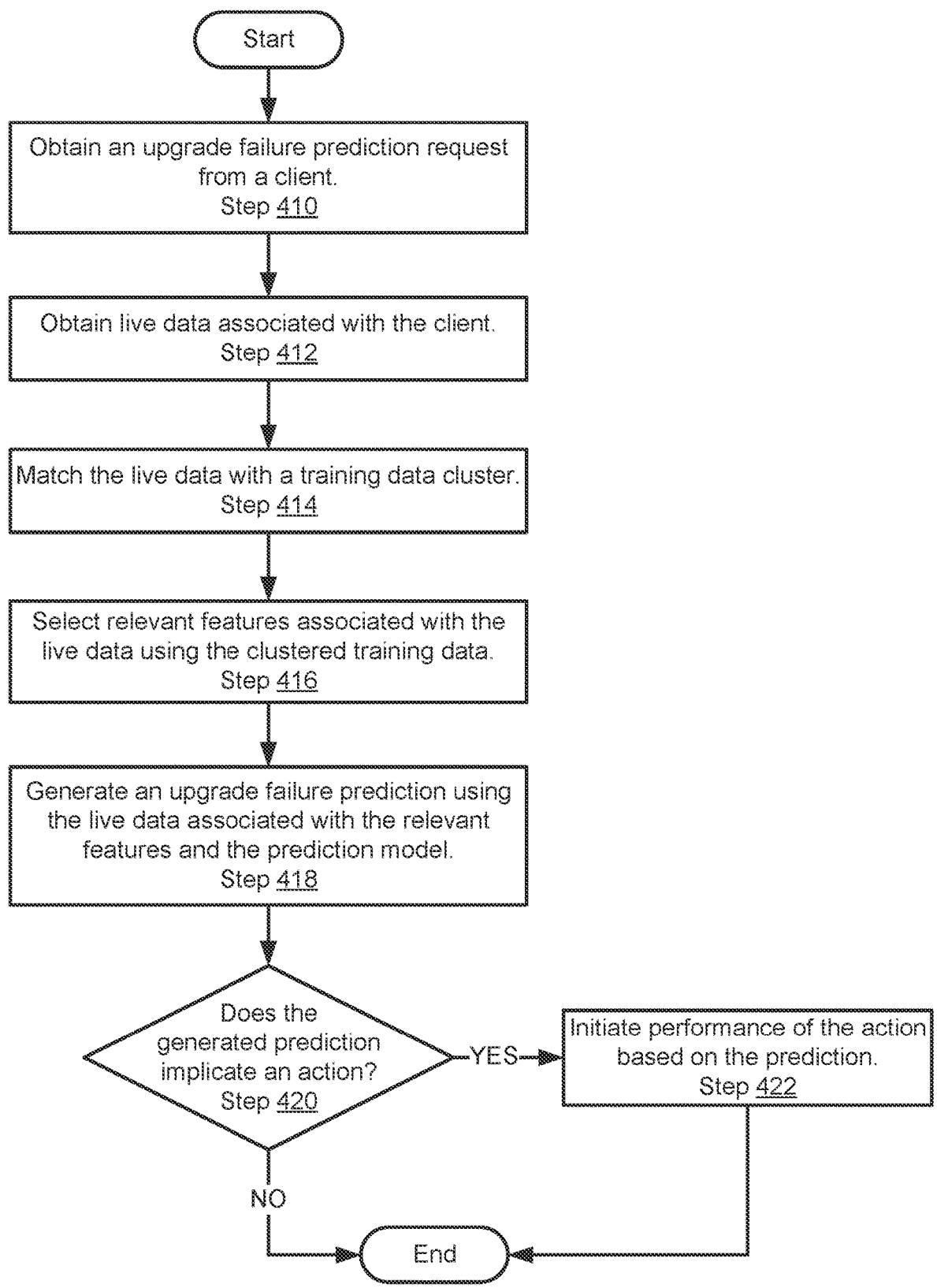
FIG. 4B shows a flowchart of a method of generating an upgrade failure prediction in accordance with one or more embodiments of the invention.

The prediction model generator (200) may be implemented using computer instructions (e.g., computing code) stored on a persistent storage (e.g., 140, FIG. 1) that when executed by a processor of the recommendation engine (120) causes the recommendation engine to perform the functionality of the prediction model generator (200) described throughout this application and/or all or a portion of the methods illustrated in FIGS. 4A-4B.

In one or more embodiments of the invention, the training data processor (202) provides training data processing services and training data clustering services for the recommendation engine (120). The training data processing services may include processing raw training data to generate processed training data. To process raw training data, the training data processor may normalize, scale, and otherwise transform the raw training data into a form that is compatible with the classification algorithm used to generate prediction models (146, FIG. 1). The processing may also include applying the raw training data to natural language processing algorithm to transform human readable text of raw training data into computer readable data in the processed training data. Additionally, for each instance of training data included in the raw training data, the training data processor may generate z-scores associated with each instance that indicate the likelihood an user upgrade will require user involvement to resolve. The training data clustering services may include separating processed training data into clusters, wherein a cluster may include processed training data with similar features. The clustered training data may be matched with live data during the generation of a prediction to select features included in the live data that may be more relevant to the prediction model. The training data processor (202) may provide other and/or additional services to the recommendation engine (120) and/or other entities without departing from the invention.

In one or more embodiments of the invention, the training data processor (202) is implemented using a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the training data processor (202) described throughout this application and/or all or a portion of the methods illustrated in FIGS. 4A-4B. The training data processor (202) may include other types of physical devices without departing from the invention.

The training data processor (202) may be implemented using computer instructions (e.g. computer code) stored on a persistent storage that when executed by a processor of the recommendation engine (120), cause the recommendation engine (120) to provide the functionality of the training data processor (202) described throughout this application and/or all or a portion of the methods illustrated in FIGS. 4A-4B.

In one or more embodiments of the invention, the feature selector (204) provides feature selection services for the recommendation engine (120) and/or other entities. The feature selection services may include selecting a subset of relevant features included in the clustered training data for use in the construction of subsequent prediction models (146, FIG. 1) and the performance of upgrade failure predication services for live data of clients. The relevant features may be used to select the raw refinement training data (310, FIG. 3A) from the clients (100, FIG. 1). For additional information regarding baseline training data (300, FIG. 3A) and refinement training data (310, FIG. 3A), refer to FIG. 3A. The feature selector (204) may provide other and/or additional services without departing from the invention.

A feature may be an individual measurable property or characteristic of a phenomenon being observed. Features may be, for example, numeric representations of the observations of the phenomenon. For example, a feature pertaining to the upgrade failure prediction may be client component temperature. The temperature of a client component may be a characteristic heavily associated with upgrade failure. For example, if the temperature of the client component exceeds a certain threshold, the client component may be more likely to fail during an upgrade than if the temperature did not exceed the aforementioned threshold.

Choosing certain features to include in model generation and prediction generation may lead to more effective models and upgrade failure predictions. For example, two features that may be included in the raw baseline training data (300, FIG. 3A) are client component temperature and client component read errors. The feature selector (204) may determine temperature is highly relevant to upgrade failure prediction and that the read errors are not very relevant to upgrade failure prediction. In other words, the temperature may be strongly correlated with failure that requires user involvement to resolve while the read errors may not be correlated with upgrade failure or may be correlated with upgrade failure that does not require user involvement to resolve. Large differences in temperature may affect client component failure, whereas large differences in read errors may not affect upgrade failure. In such a scenario, the feature selector (204) may notify the recommendation system (110, FIG. 1) of the relevancy of these two features, and the raw refinement training data (310, FIG. 3A) used to generate the additional prediction models and live data used to generate upgrade failure predictions may include the temperature feature and may not include the read error feature.

In one or more embodiments of the invention, the feature selector (204) is implemented using a physical device. The physical device may include circuitry. The physical device may be, for example, a field-programmable gate array, application specific integrated circuit, programmable processor, microcontroller, digital signal processor, or other hardware processor. The physical device may be adapted to provide the functionality of the feature selector (204) described throughout this application and/or all or a portion of the methods illustrated in FIGS. 4A-4B. The feature selector (204) may be implemented using other types of physical devices without departing from the invention.

The feature selector (204) may be implemented using computer instructions (e.g. computer code) stored on a persistent storage that when executed by a processor of the recommendation engine (120), cause the recommendation engine (120) to provide the functionality of the feature selector (204) described throughout this application and/or all or a portion of the methods illustrated in FIGS. 4A-4B.

While the recommendation engine (120) of FIG. 2 has been described and illustrated as including a limited number of components for the sake of brevity, a recommendation engine (120) in accordance with embodiments of the invention may include additional, fewer, and/or different components than those illustrated in FIG. 2 without departing from the invention.

Figure 3A:
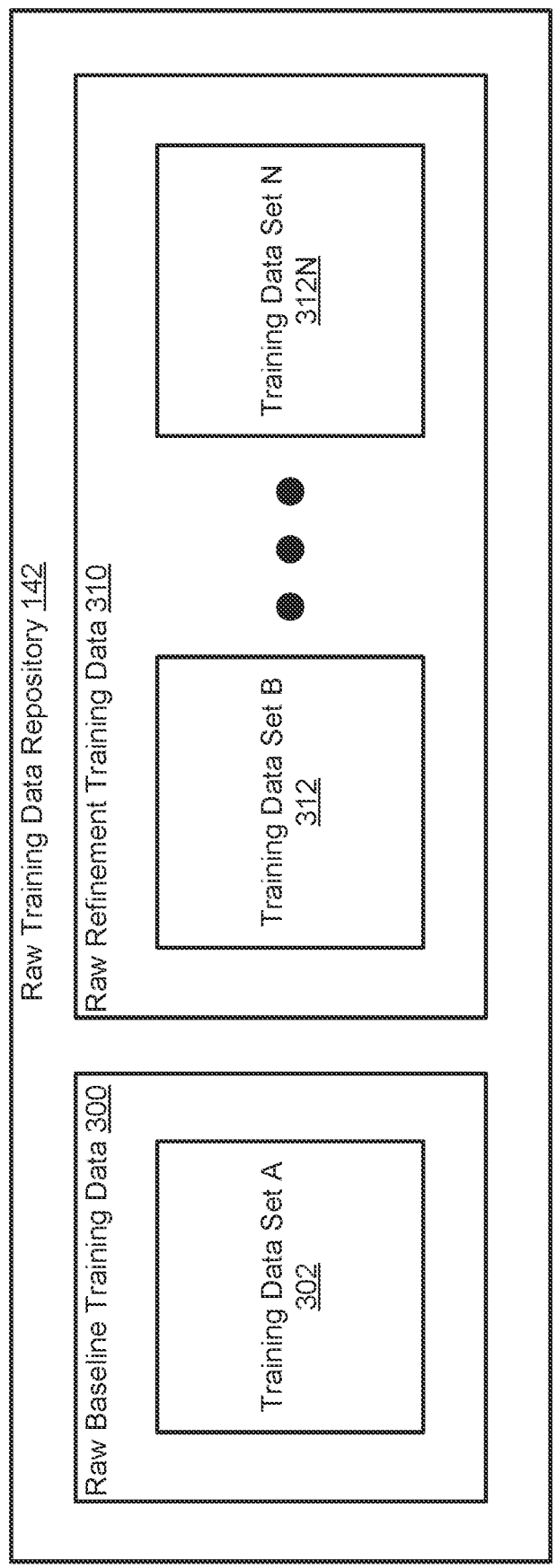
FIG. 3A shows a diagram of a training data repository in accordance with one or more embodiments of the invention.

FIG. 3A shows a diagram of a raw training data repository in accordance with one or more embodiments of the invention. The raw training data repository (142) may be similar to the raw training data repository shown in FIG. 1. The data structures stored in the raw training data repository (142) may include raw training data provided by clients (100, FIG. 1) and utilized by a recommendation engine (120, FIG. 1). The raw training data may include raw baseline training data (300) and/or raw refinement training data (310). Each of these data structures is discussed below.

The raw baseline training data (300) may be a data structure that includes data provided by the clients (100, FIG. 1). The data may include the data regarding the client components, upgrades to client components, and upgrade failures of the clients (100, FIG. 1). The raw baseline training data (300) may include any number of features. The raw baseline training data (300) may be used by the recommendation engine (120, FIG. 1) to generate a first prediction model. The raw baseline training data may include a training data set A (302). For additional information regarding training data set A, refer to FIG. 3B. The raw baseline training data (300) may include other and/or additional training data sets without departing from the invention.

The raw refinement training data (310) may be a data structure including data provided by the clients (100, FIG. 1). The raw refinement training data (310) may include data client components, upgrades to client components, and upgrade failures of the clients (100, FIG. 1). The raw refinement training data (310) may include fewer features than the raw baseline training data (300). The raw features included in the refinement training data (310) may be the features selected by the feature selector (204, FIG. 2). The raw refinement training data (310) may be used by the recommendation engine (120, FIG. 1) to generate improved prediction models (146, FIG. 1). The raw refinement training data (310) may include one or more training data sets (e.g., training data set B (312) and training data set N (312N)). There may be any number of training data sets (e.g., 312 and 312N) in the raw refinement training data (310).

While the raw training data repository (142) of FIG. 3 has been described and illustrated as including a limited number of components for the sake of brevity, a training data repository (142) in accordance with embodiments of the invention may include additional, fewer, and/or different components than those illustrated in FIG. 3 without departing from the invention.

Figure 3B:
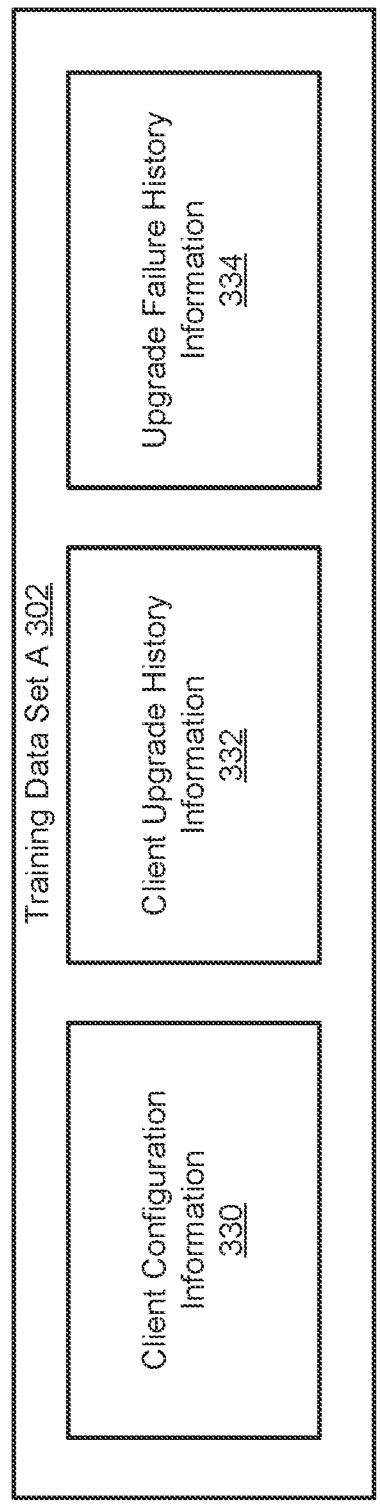
FIG. 3B shows a diagram of a training data set in accordance with one or more embodiments of the invention.

FIG. 3B shows a diagram of a training data set in accordance with one or more embodiments of the invention. The training data set A (302) may be similar to the training data set A (302) shown in FIG. 3A. Training data set A (302) may be a data structure that includes data from clients (100, FIG. 1) regarding the client components, upgrades, and upgrade failures. The data in training data set A (302) may include any number of features. The features included in training data set A (302) may represent observable phenomena associated with upgrade failures of the clients.

Training data set A (302) may include more features than the training data sets (e.g., 332, 332N, FIG. 3) included in the raw refinement training data (310). The features may include client configuration information (330), client upgrade history information (332), and upgrade failure history information (334). The features may include other types of features without departing from the invention. Each of the of the aforementioned types of features is discussed below.

The client configuration information (330) may be one or more data structures that include features regarding the client components included in the clients (e.g., 100, FIG. 1) as discussed above. The client configuration information features may include information regarding the client components. The information may include, for example, client component identifiers, client component types, client component performance information, and other and/or additional information regarding the client components without departing from the invention. The client component identifiers may refer to unique, global bit strings associated with a particular client component that may be used to specify that particular component. The client component type may be a unique bit string, or tag associated with a type of client component. The client component types may be types of hardware devices such as central control processors (CPUs), graphics control processors (GPUs), FPGAs, network controllers, storage devices such as tape drives or RAM, and/or other and/or additional types of hardware devices included in the clients without departing from the invention. The client component type may also be types of software components such as operating systems, applications (e.g., database applications), virtual machines, and/or other and/or additional types of software components without departing from the invention. The client performance information may include performance characteristics associated with the client components. The performance characteristics may include read and write errors to storage devices, temperature of client components, timestamps associated with client configuration information (330), client component dependencies, authorization information associated with client components, and other and/or additional types of performance characteristics without departing from the invention. The client configuration information (330) may be generated by the clients (100, FIG. 1) and/or other entities not illustrated in the system of FIG. 1. The client configuration information (330) may be included in the raw training data obtained by the recommendation system (110, FIG. 1) and may be used by the recommendation system (110, FIG. 1) to generate prediction models (146, FIG. 1) and upgrade failure predictions. The client configuration information (330) may include other and/or additional information and may be used for other and/or additional purposes without departing from the invention.

The client upgrade history information (332) may be one or more data structures that include features regarding the upgrades made to the client components in the clients (e.g., 100, FIG. 1) as discussed above. The client upgrade history information (332) features may include information regarding the upgrades to the client components. The information may include, for example, upgrade identifiers, client component identifiers (e.g., see above), upgrade types, and upgrade timestamps. The upgrade identifiers may refer to unique, global bit strings associated with a particular upgrade that may be used to specify that particular upgrade. An upgrade type may be a unique bit string, or tag associated with a type of upgrade. The upgrade types may be partial patches of software components, version upgrades of entire software components, upgrades of one type of client component by replacement with another, and/or other and/or additional types of upgrades without departing from the invention. The upgrade timestamps may be the time and/or date in which an upgrade was made. The upgrade timestamps may be represented using seconds, minutes, hours, days, months, years, and/or any other representation of time without departing from the invention. The client upgrade history information (332) may be generated by the clients (100, FIG. 1) and/or other entities not illustrated in the system of FIG. 1. The client upgrade history information (332) may be included in the raw training data obtained by the recommendation system (110, FIG. 1) and may be used by the recommendation system (110, FIG. 1) to generate prediction models and upgrade failure predictions. The client upgrade history information (332) may include other and/or additional information and may be used for other and/or additional purposes without departing from the invention.

The upgrade failure history information (334) may be one or more data structures that include features regarding the upgrade failures associated with client components in the clients (e.g., 100, FIG. 1) as discussed above. The upgrade failure history information features may include information regarding the failures of upgrades to the client components. The information may include, for example, upgrade identifiers (e.g., see above), client component identifiers (e.g., see above), upgrade failure causes, upgrade failure resolutions, and upgrade failure timestamps. The upgrade failure causes may be information that specifies what caused the upgrade failure and/or a description of the upgrade failure. For example, an upgrade failure cause may include incorrect authorization credentials for a software upgrade. An upgrade failure resolution may include information regarding how an upgrade failure was resolved. The upgrade failure resolution may specify how the upgrade failure was resolve and if a user was required to resolve the upgrade failure. Continuing with the previous example, an upgrade failure due to incorrect authorization credentials may include an upgrade failure resolution that specifies that the authorization credentials were updated and that the resolution required user involvement. The upgrade failure timestamps may be the time and/or date in which an upgrade failure occurred and when the upgrade failure was resolved. The upgrade failure timestamps may be represented using seconds, minutes, hours, days, months, years, and/or any other representation of time without departing from the invention. The upgrade failure history information (334) may be generated by the clients (100, FIG. 1) and/or other entities not illustrated in the system of FIG. 1. The upgrade failure history information (334) may be included in the raw training data obtained by the recommendation system (110, FIG. 1) and may be used by the recommendation system (110, FIG. 1) to generate prediction models and upgrade failure predictions. The upgrade failure history information (334) may include other and/or additional information and may be used for other and/or additional purposes without departing from the invention.

While the training data set A (302) of FIG. 3B has been described and illustrated as including a limited number of components for the sake of brevity, a training data set A (302) in accordance with embodiments of the invention may include additional, fewer, and/or different components than those illustrated in FIG. 3B without departing from the invention.

FIG. 3C shows a diagram of a clustered training data repository (144) in accordance with one or more embodiments of the invention. A clustered training data repository (144) may include one or more training data clusters (e.g., training data cluster A (320A), training data cluster B (320B), and training data cluster N (320). As discussed above, a cluster of training data may be training data that shares one or more characteristics and is, therefore, similar. For example, training data cluster A (320A) includes client configuration A (322A) from one or more clients that are similar, upgrade history information A (324A) from one or more clients that are similar, and/or upgrade failure history information A (326A) from one or more clients that are similar. Training data cluster B (320B) includes client configuration B (322B) from one or more clients that are similar but different from those of training data cluster A (320A), upgrade history information B (324B) from one or more clients that are similar but different from those of training data cluster A (320A), and/or upgrade failure history information B (326B) from one or more clients that are similar but different from those of training data cluster A (320A). The clustered training data repository (144) may be used by the recommendation engine (120, FIG. 1) to identify relevant features associated with live data obtained from the clients (100, FIG. 1). The clustered training data repository (144) may include other and/or additional data and/or information without departing from the invention.

As discussed above, a recommendation system in accordance with embodiments of the invention may generate prediction models and provide upgrade failure predictions that indicate whether user intervention is to be required to resolve the failures. FIGS. 4A-4B show methods that may be performed by a recommendation system when providing upgrade failure prediction services.

FIG. 4A shows a flowchart of a method of generating a prediction model in accordance with one or more embodiments of the invention. The method may be performed by, for example, the recommendation system (110, FIG. 1). Other components of the system illustrated in FIG. 1 may perform all, or a portion, of the method of FIG. 4A without departing from the invention.

While FIG. 4A is illustrated as a series of steps, any of the steps may be omitted, performed in a different order, additional steps may be included, and/or any or all of the steps may be performed in a parallel and/or partially overlapping manner without departing from the invention.

In step 400, a training event associated with clients is identified.

In one or more embodiments of the invention, the recommendation engine (120, FIG. 1) of the recommendation system (110, FIG. 1) obtains a message from a client. A user of the client may generate the message to send to the recommendation engine. The message may include a request to generate a prediction model. The prediction model may be a first prediction model generated by the recommendation system, or in another embodiment of the invention, the prediction model may be a subsequent prediction model that may include more improved upgrade failure prediction services than the previously generated prediction model. A client may periodically send messages that include requests to generate prediction models in order to improve the upgrade failure prediction services over time. The message may include the client identifiers that may specify the clients associated with the message. The recommendation engine may identify obtaining the message as the training event associated with the clients without departing from the invention. The message may specify the generation of an initial prediction model or the generation of a prediction model to improve the performance of the upgrade failure prediction services of an existing prediction model. The training event associated with the clients may be identified via other and/or additional methods without departing from the invention.

In step 402, raw training data associated with the clients is obtained.

In one or more embodiments of the invention, the training data manager of the recommendation system sends a message to the clients associated with the training event. The training data manager may identify the clients based on the client identifiers obtained in step 400. The message may include a request to obtain the raw training data from the clients. In response to obtaining the message, the clients may generate the raw training data, or obtain the previously generated raw training data not used to generate a previous prediction model from the persistent storage of the clients or other entities not shown in the system of FIG. 1. After generating and/or obtaining the raw training data, the clients send a message to the recommendation system. The message may include the raw training data. After obtaining the raw training data, the training data manager may store the raw training data in the raw training data repository. For an initial prediction model, the training data manager may store the raw training data as raw baseline training data. For subsequent prediction models, the training data manager may store the raw training data as raw refinement training data. The raw training data associated with the clients may be obtained via other and/or additional methods without departing from the invention.

In step 404, processed training data is obtained using the raw training data.

In one or more embodiments of the invention, the training data processor transforms the raw training data into the processed training data. The raw training data may be in a form which may not be compatible with the classification algorithm used to generate the prediction models or which may be inefficient to apply to the classification algorithm. The training data processor may generate the processed training data by binning, scaling, and/or applying the raw training data to natural language processing algorithms. Binning may refer to assigning levels to the attributes in or to discretize the feature values included in the raw training data. Binning may be performed using equal-frequency binning algorithm or equal-width binning algorithm. Scaling may refer to normalizing the values of the features, or shifting and/or scaling the values between two fixed numbers (e.g., zero and one), wherein the two numbers are the minimum and maximum scaled values of the features. The training data processor may apply the raw training data to a natural language processing algorithm that may transform human readable text included in the raw training data to computer readable data that may be used in the classification algorithm to generate the prediction model. The training data processor may further process the raw training data by generating absolute value matrixes that include motifs associated with features included in the raw training data and any other and/or additional transformations without departing from the invention.

In one or more embodiments of the invention, the training data processor generates Z-scores for raw training data. The training data processor tags the raw training data that includes feature values that are associated with a failure that required user involvement to resolve with a failed tag. The training data processor tags the raw training data that includes feature values that are associated with a failure that did not require user involvement to resolve the with a not required tag. For each feature over all samples of the feature, the Z-score is generated by dividing the difference between the mean value of the feature values associated with a failed tag and the mean of the feature values associated with a not required tag by the addition of the square root of the variance of the feature values associated with a failed tag divided by the total number of samples of feature values associated with a failed tag and the variance of the feature values associated with a not required tag divided by the total number of samples of feature values associated with a not required tag. A large, positive Z-score indicates that a feature occurred frequently in the sample of raw training data that is associated with upgrade failures that required user involvement to resolve. The recommendation engine may apply the processed training data associated with the features that include a large, positive Z-score to the classification algorithm to generate a prediction model to improve the accuracy and efficiency of the prediction model. Relevant features may also be identified by other methods such as nonparametric reverse arrangement tests and other and/or additional methods without departing from the invention. Processed training data may be obtained using the raw training data via other and/or additional methods without departing from the invention.

In step 406, clustered training data is generated using the processed training data.

In one or more embodiments of the invention, the training data processor separates the processed training data into clusters to generate clustered training data. The training data processor may identify the same and/or similar relevant features in the processed training data that occur frequently throughout the processed training data and may group those features and the processed training data associated with the features in a training data cluster. The training data processor may separate the processed training data into training data clusters based on relevant features such as client configuration information (i.e., processed training data obtained from the same client or clients with similar client components), upgrade types, and other and/or additional relevant features without departing from the invention. The training data processor may store the generated clustered training data in the clustered training data repository. The clustered training data may be generated using the processed training data via other and/or additional methods without departing from the invention.

In step 408, a prediction model is generated by applying the processed training data to a classification algorithm.

In one or more embodiments of the invention, the recommendation engine obtains the processed training data and introduces the processed training data to a classification algorithm to generate the prediction model. The classification algorithm may be, for example, a naive Bayesian classification algorithm. The naive Bayesian classification algorithm, when operating on the processed training data, may generate prediction calculations, each: (i) reflecting a subset of features included in the processed training data and (ii) generating an upgrade failure prediction. The generated prediction calculations may be used, in accordance with the model, to generate upgrade failure predictions. The prediction model may be generated via other and/or additional methods without departing from the invention. For example, different types of machine learning algorithms and/or classification algorithms may be utilized to generate corresponding data structures that may be used to generate upgrade failure predictions without departing from the invention.

The method may end following step 408.

FIG. 4B shows a flowchart of a method of generating an upgrade failure prediction in accordance with one or more embodiments of the invention. The method may be performed by, for example, the recommendation system (110, FIG. 1). Other components of the system illustrated in FIG. 1 may perform all, or a portion, of the method of FIG. 4B without departing from the invention.

While FIG. 4B is illustrated as a series of steps, any of the steps may be omitted, performed in a different order, additional steps may be included, and/or any or all of the steps may be performed in a parallel and/or partially overlapping manner without departing from the invention.

In step 410, an upgrade failure prediction request is obtained from a client.

In one or more embodiments of the invention, the recommendation engine of the recommendation system obtains a message from a client. A user of the client may generate the message to send to the recommendation engine. The message may include a request to generate an upgrade failure prediction. A client may send messages that include requests to generate upgrade failure predictions when an upgrade fails or to determine if an upgrade were to fail, whether user involvement would be required to resolve the upgrade failure. The message may include the client identifier that may specify the client associated with the message. The upgrade failure prediction request may be obtained via other and/or additional methods without departing from the invention.

In step 412, live data associated with the client is obtained.

In one or more embodiments of the invention, the training data manager of the recommendation system sends a message to the client associated with the upgrade failure prediction request. The training data manager may identify the client based on the client identifier obtained in step 410. The message may include a request to obtain the live data from the client. In response to obtaining the message, the clients may generate the live data, or obtain the previously generated live data not used to generate a prediction model from the persistent storage of the client or other entities not shown in the system of FIG. 1. After generating and/or obtaining the live data, the clients send a message to the recommendation system. The message may include the live data. The live data may include client configuration information, client upgrade history information, and/or client failure history associated with the client. The live data associated with the client may be obtained via other and/or additional methods without departing from the invention.

In step 414, the live data is matched with a training data cluster.

In one or more embodiments of the invention, the recommendation engine matches features included in the live data with a training data cluster that includes the same and/or similar features. Prior to matching the live data with a training data cluster, a training data processor may process the live data in similar manner discussed above in step 404 to transform the live data into a form that is compatible with the prediction model. The live data may be matched to a training data cluster based on features such as client configuration information (i.e., processed training data obtained from the same client or clients with similar client components), upgrade types, and other and/or additional features that are the same or similar to those in both the training data cluster and the live data without departing from the invention. For example, the recommendation engine may match the live data from a client with a client configuration to a training data cluster that includes training data associated with the same client configuration as that of the client from which the live training data was obtained. The live data may be matched with a training data cluster via other and/or additional methods without departing from the invention.

In step 416, relevant features associated with the live data are selected using the clustered training data.

In one or more embodiments of the invention, the recommendation engine selects the relevant features associated with the live data using the Z-scores included in the clustered training data. As discussed above, during the generation of the processed training data included in the training data cluster, the training data processor generates Z-scores associated with the features included in the processed training data. Also as discussed above, a large, positive Z-score may indicate that a feature is highly relevant in predicting user involvement requirements to resolve upgrade failures. The recommendation engine may identify features included in the clustered training data that are associated with large, positive Z-scores. The recommendation engine may select the identified features in the live data as relevant features. The relevant features associated with the live data may be selected using the clustered training data via other and/or additional methods without departing from the invention.

In step 418, an upgrade failure prediction is generated using live data associated with the relevant features and the prediction model.

In one or more embodiments of the invention, the recommendation engine introduces the live data associated with the relevant features into the most recently generated prediction model. In other words, the most recently generated prediction model may use the live data as input and produce an upgrade failure prediction. The upgrade failure prediction may be that the upgrade failure will require user involvement to resolve the upgrade failure or that the upgrade failure will not require user involvement to resolve the upgrade failure. An upgrade failure prediction may be generated via other and/or additional methods without departing from the invention.

In step 420, a determination is made as to whether the generated prediction implicates an action.

In one or more embodiments of the invention, the recommendation system accesses the diagnostic repository and uses the generated upgrade failure prediction to determine if an action is implicated. As discussed above, the diagnostic repository may include upgrade failure predictions and corresponding actions to be initiated by the recommendation system. For example, the upgrade failure prediction may be that the upgrade failure will require user involvement to resolve the upgrade failure. Based on the upgrade failure prediction, the diagnostic repository may indicate that the recommendation system is to trigger a flag on the client that indicates that the upgrade failure is likely to require user involvement to resolve. However, the upgrade failure prediction may be that the upgrade failure is unlikely to require user involvement to resolve the failure. Thus, it may be determined that the upgrade failure prediction does not implicate an action. Alternatively, an upgrade failure prediction may not be associated with any actions by the diagnostic repository in a scenario in which it is unimportant to the operation of a device if upgrade failure requires user involvement to resolve. It may be determined that the generated prediction implicates an action via other and/or additional methods without departing from the invention.

If the generated prediction implicates an action, then the method proceeds to step 422. If the generated prediction does not implicate an action, then the method may end following step 420.

In step 422, the performance of the action is initiated based on the prediction.

As discussed above, an upgrade failure prediction may be generated that implicates an action. The implicated action may be to trigger a flag that warns the client that the upgrade failure will require user involvement to resolve. The implicated action may be other types of actions without departing from the invention.

To initiate the performance of triggering a flag on the client, the recommendation system may send a message requesting that the client trigger the flag. The client may trigger the flag in response to the request from the recommendation system. By triggering the flag, users and/or other entities may be notified to take action. For example, other entities may perform actions that lessen the potential impact of an upgrade failure requiring user involvement to resolve or that otherwise proactively address the potential upgrade failure requiring user involvement to resolve. The performance of an action may be initiated via some other and/or additional methods without departing from the invention.

The method may end following step 422.

Figure 5A:
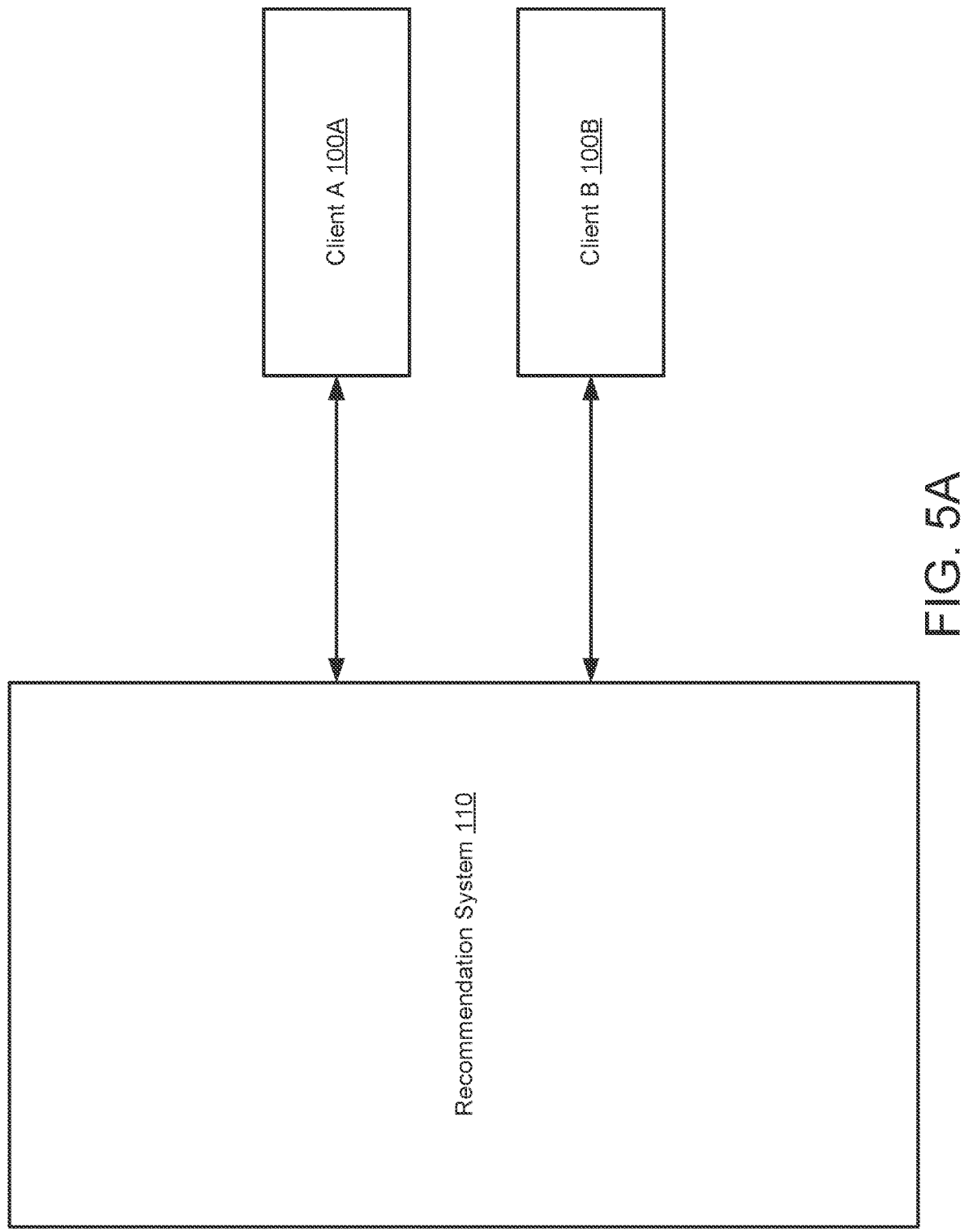
Figure 5C:
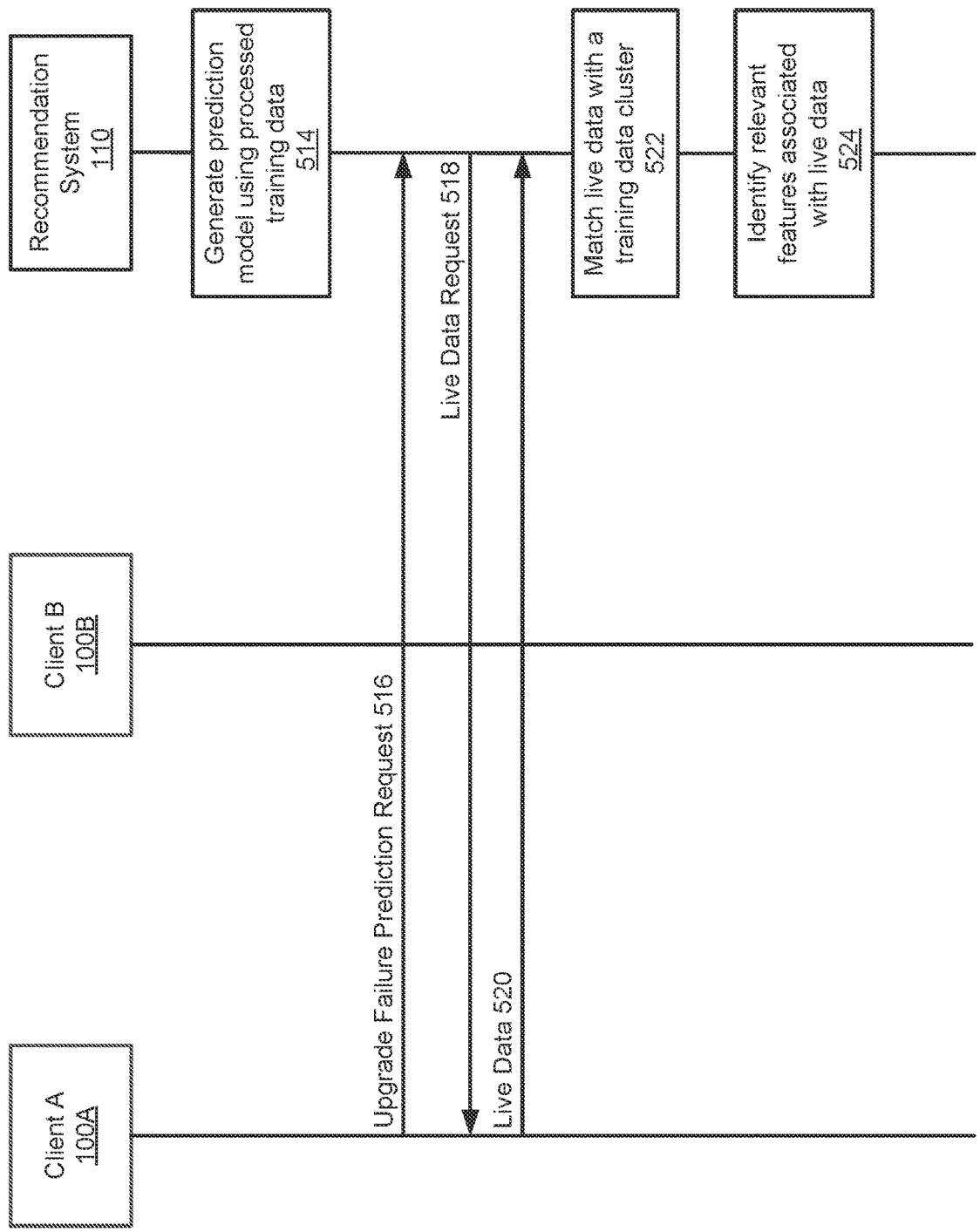
Figure 5D:
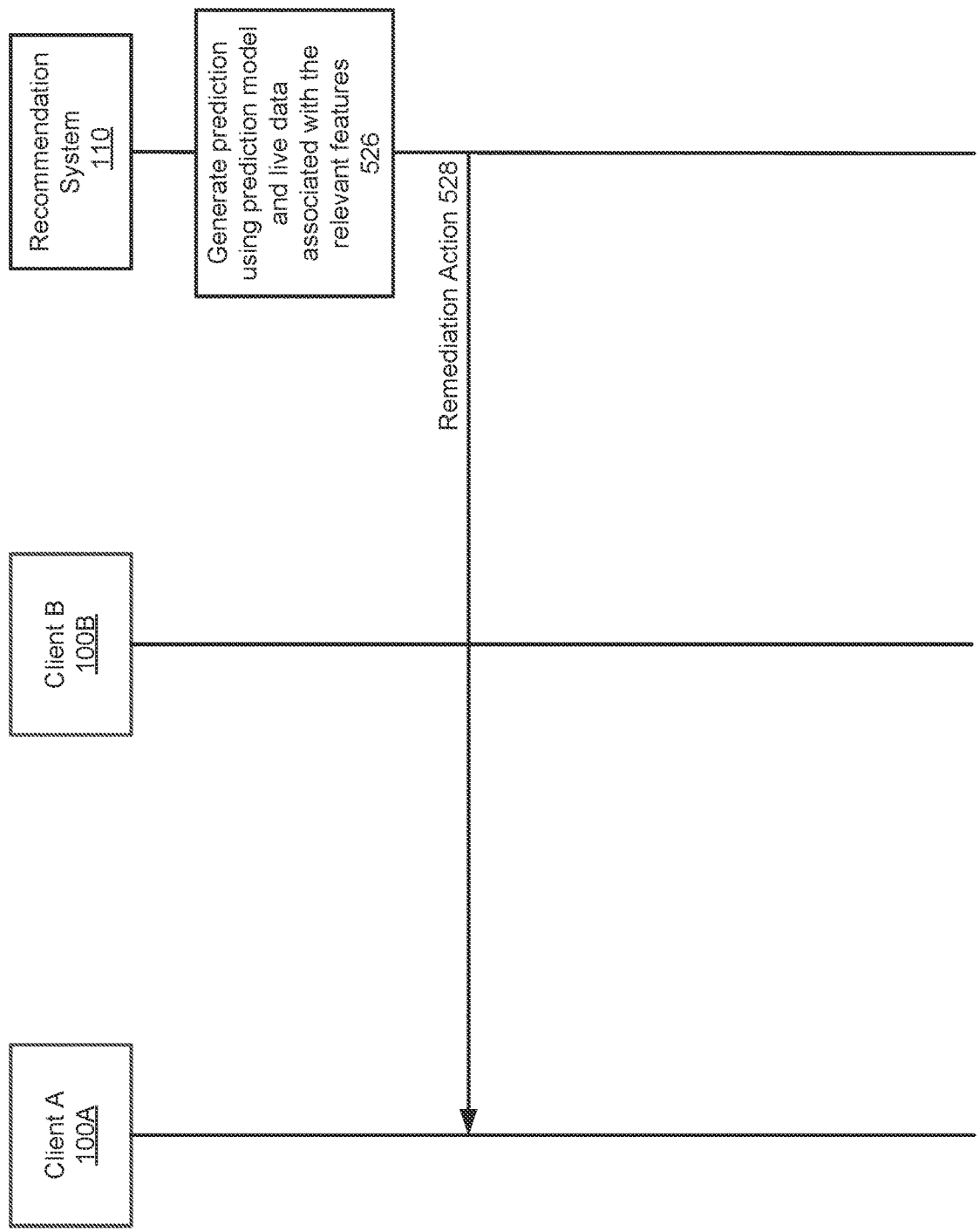

To further clarify aspects of embodiments of the invention, a non-limiting example is provided in FIGS. 5A-5E. FIG. 5A shows a diagram of an example system, FIGS. 5B-5D shows diagrams of actions that may be performed by the example system of FIG. 5A, and FIG. 5E shows a diagram of an example data structure used to perform the aforementioned actions. The system of FIG. 5A may be similar to that of FIG. 1. For the sake of brevity, only a limited number of components of the system of FIG. 1 are illustrated in FIG. 5A.

Example

Consider a scenario as illustrated in FIG. 5A in which a recommendation system (110) is providing upgrade failure prediction services for two clients, client A (100A) and client B (100B). As discussed above, other components of the recommendation system (110) are not illustrated in FIGS. 5A-5E for brevity.

To provide such upgrade failure prediction services, the clients (100A and 100B) (or other entities such as a manager of the clients) may request an upgrade failure prediction from the recommendation system (110). FIG. 5B shows a first interaction diagram that illustrates interactions between the recommendation system (110), client A (100A), and client B (100B).

First, the recommendation system identifies a training event associated with client A (100A) and client B (100B) (500). In response to identifying the training data request, the recommendation system (110) sends a training data request to client A (100A) (502). Client A (100A) then sends raw training data A (504) to the recommendation system (110). The recommendation system (110) then sends a training data request to client B (100B) (506). Then client B (100B) sends raw raining data B (508) to the recommendation system (110). Client B (100B) may send raw training data B (508) to the recommendation system (110) prior to client A (100A) sending raw training data A (504) to the recommendation system (110) without departing from the invention. After obtaining raw training data A (504) and raw training data B (508), the recommendation system (110) generates a processed training data using raw training data A (504) and raw training data B (508) from the clients (510). After the processed training data is generated, the recommendation system (110) generates clustered training data (512) using the processed training data (510). For an example of the clustered training data (512), refer to FIG. 5E.

FIG. 5C shows a second interaction diagram that illustrates interactions between the recommendation system (110), client A (100A), and client B (100B). Turning to FIG. 5C, after the clustered training data is generated, the recommendation system generates a prediction model using the processed training data (514). At some point in time after the prediction model is generated, the client sends an upgrade failure prediction request (516) to the recommendation system (110). In response to obtaining the upgrade failure prediction request, the recommendation system (110) sends a live data request (518) to client A (100A). After obtaining the live data request, client A (100A) generates and/or obtains live data and sends the live data (520) to the recommendation system (110). Once the live data is obtained, the recommendation system (110) matches the live data with a training data cluster (522). The recommendation system (110) then identifies the relevant features included in the training data cluster using the Z-scores associated with the features included in the clustered training data (524).

FIG. 5D shows a third interaction diagram that illustrates interactions between the recommendation system (110), client A (100A), and client B (100B). Turning to FIG. 5D, after the relevant features are identified, the recommendation system (110) generates an upgrade failure prediction using the prediction model and the live data associated with the relevant features (526). In response to generating the prediction, the recommendation system (110) identifies an action. The generated upgrade failure prediction indicates the upgrade failure will require user involvement to resolve the upgrade failure. Based on the upgrade failure prediction, the recommendation system (110) identifies a remediation action included in the diagnostic repository. The recommendation system (110) then sends the message initiating the performance of the remediation action (528) on client A (100A).

FIG. 5E shows an example of a data structure used in example actions illustrated in FIGS. 5B-5D. Turing to FIG. 5E, the example data structure is an example clustered training data repository (530). The example clustered training data cluster includes two training data clusters, training data cluster A (532A) and training data cluster B (532B). In this example, the training data clusters (532A, 532B) were separated based on the client associated with the processed training data. All training data associated with client A (100A) is included in training data cluster A (532A) and all training data associated with client B (100B) is included in training data cluster A (534A). The recommendation system matches the live data from client A (100A) in FIG. 5C with training data cluster A (532A) and uses training data cluster A (532A) to identify relevant features.

End of Example

Thus, as illustrated in FIGS. 5A-5E, embodiments of the invention may provide a method for predicting future user involvement requirements to resolve failures of client component upgrades. By predicting such future requirements, future failures may be proactively addressed by users. Consequently, the impact of the potential future failures may be reduced.

Figure 6:
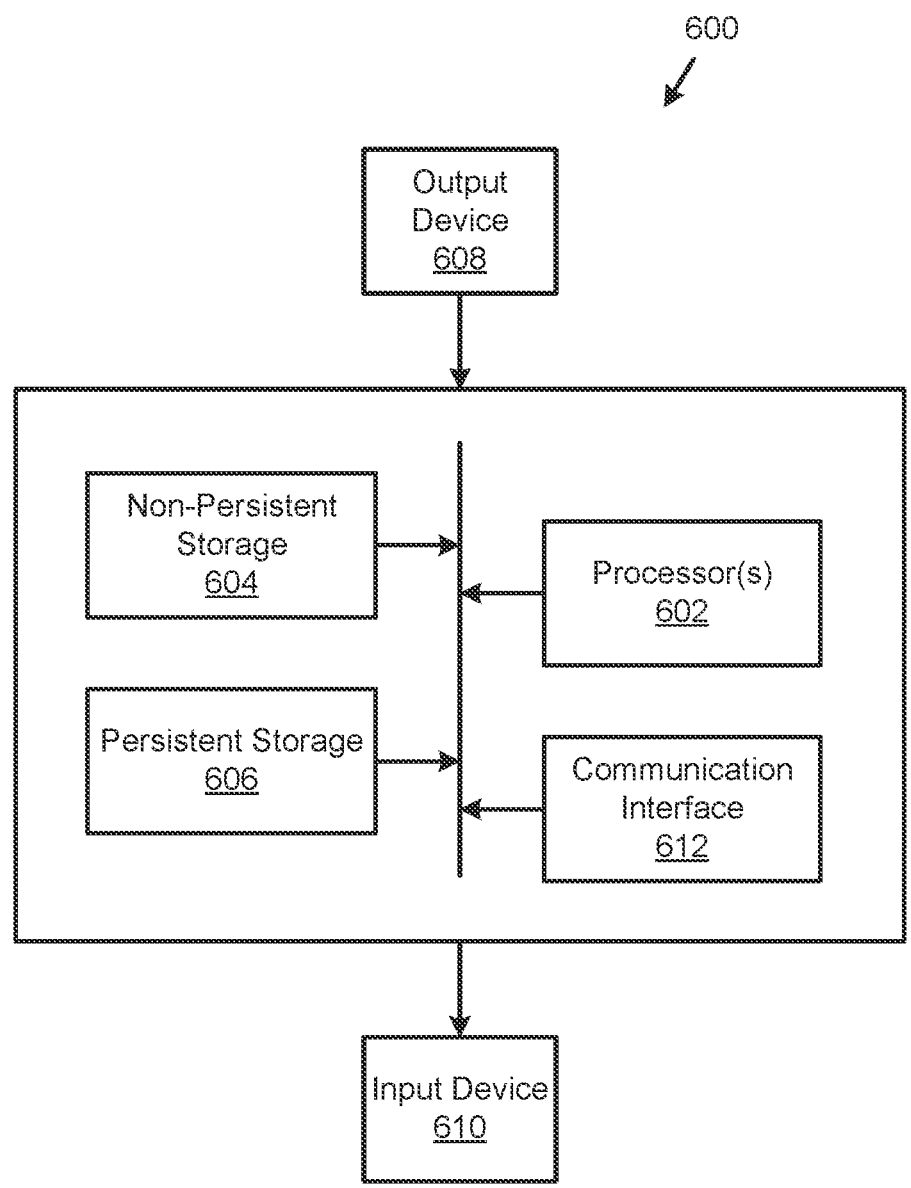
FIG. 6 shows a diagram of a computing device in accordance with one or more embodiments of the invention.

As discussed above, embodiments of the invention may be implemented using computing devices. FIG. 6 shows a diagram of a computing device in accordance with one or more embodiments of the invention. The computing device (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment of the invention, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

One or more embodiments of the invention may improve the operation of one or more computing devices. More specifically, embodiments of the invention relate to generating upgrade failure prediction that indicate whether user involvement will be required to resolve upgrade failures. To generate the predictions, the system may generate a prediction model by obtaining raw training data from clients, processing the raw training data to obtain processed training data, clustering the processed training data, and generating a prediction model may inputting the processed training data into a classification algorithm. After the prediction model is generated, live data may be obtained from a client associated with a potential upgrade. The live data may be matched with clustered training data to identify relevant features included in the live data. The live data associated with the relevant features may be applied to the prediction model to generate a prediction. The prediction may implicate an action that includes notifying a user that the upgrade failure may or may not require user involvement to resolve the upgrade failure. The generated predictions may be used to proactively address potential upgrade failures of client components. By doing so, the impact of client component upgrade failures on systems may be reduced.

Thus, embodiments of the invention may address the problem of inefficient use of computing resources to store and protect data in a multiple cluster system. This problem arises due to the nature of the technological environment in which the data of the data cluster is stored.

The problems discussed above should be understood as being examples of problems solved by embodiments of the invention disclosed herein and the invention should not be limited to solving the same/similar problems. The disclosed invention is broadly applicable to address a range of problems beyond those discussed herein.

While the invention has been described with respect to a limited number of embodiments, those skilled in the art, having benefited from this disclosure, will appreciate that other embodiments can be devised which do not depart from the scope of the technology as disclosed herein. Accordingly, the scope of the invention should be limited only by the attached claims.

What is claimed is:

1. A method for managing upgrades of components of clients, comprising:
   obtaining an upgrade failure prediction request associated with an upgrade of an upgrade type of upgrade types, wherein the upgrade types comprise:
      a software upgrade of a client software component of a client of clients, and
      a hardware upgrade of a client hardware component of the client;
   in response to obtaining an update failure prediction request:
      obtaining live data associated with the client;
      matching the live data with a training data cluster;
      selecting relevant features associated with processed training data of the training data cluster using a feature selection algorithm and the training data cluster, wherein:
         the processed training data comprises a plurality of features comprising client configuration information features, client upgrade history information features, and upgrade failure history information features;
         the feature selection algorithm selects and specifies the relevant features associated with the training data cluster based on Z-scores associated with the plurality of features; and
         the relevant features comprise a portion of the client configuration information features, a portion of the client upgrade history information features, and a portion of the upgrade failure history information features in the processed training data that are highly relevant to upgrade failure predictions;
      generating an upgrade failure prediction using the live data associated with the relevant features and a prediction model;
      making a determination that the upgrade failure prediction implicates an action is required; and
      based on the determination:
         initiating performance of the action.

2. The method of claim 1, further comprising:
   before obtaining the update failure prediction request:
      identifying a training event associated with the clients;
      in response to identifying the training event:
         obtaining raw training data associated with the clients;
         obtaining processed training data using the raw training data;
         generating clustered training data using the processed training data; and
         generating a prediction model by applying the processed training data to a classification algorithm.

3. The method of claim 2, wherein the raw training data comprise training data obtained from at least two of the clients.

4. The method of claim 2, wherein the live data comprises second training data obtained from only the client.

5. The method of claim 2, wherein the raw training data comprises at least one selected from a group consisted of:
   the client configuration information features,
   the client upgrade history information features, and
   the upgrade failure history information features.

6. The method of claim 5, wherein generating clustered training data comprises separating the processed training data into training data clusters, wherein a training data cluster of the training data clusters comprises at least one selected from a group consisting of:
   processed training data that comprise at least a portion of the same client configuration information features,
   processed training data that comprise at least a portion of the same client upgrade history information features, and
   processed training data that comprise at least a portion of the same upgrade failure history information features.

7. The method of claim 2, wherein the raw training data comprise more features than the relevant features.

8. The method of claim 1, wherein the action comprises notifying a user that user intervention will be required to resolve the upgrade failure.

9. A system for managing upgrades of components of clients comprises:
   persistent storage for storing:
      raw training data, and
      processed training data; and
   a recommendation system programmed to:
      obtain an upgrade failure prediction request associated with an upgrade of an upgrade type of upgrade types, wherein the upgrade types comprise:
         a software upgrade of a client software component of a client of clients, and
         a hardware upgrade of a client hardware component of the client;

in response to obtaining an update failure prediction request:
  obtain live data associated with the client;
  match the live data with a training data cluster;
  select relevant features associated with processed training data of the training data cluster using a feature selection algorithm and the training data cluster, wherein:
    the processed training data comprises a plurality of features comprising client configuration information features, client upgrade history information features, and upgrade failure history information features;
    the feature selection algorithm selects and specifies the relevant features associated with the training data cluster based on Z-scores associated with the plurality of features; and
    the relevant features comprise a portion of the client configuration information features, a portion of the client upgrade history information features, and a portion of the upgrade failure history information features in the processed training data that are highly relevant to upgrade failure predictions;
  generate an upgrade failure prediction using the live data associated with the relevant features and a prediction model;
  make a determination that the upgrade failure prediction implicates an action is required; and
  based on the determination:
    initiate performance of the action.

10. The system of claim 9, wherein the recommendation system is further programmed to:
  before obtaining the update failure prediction request:
    identify a training event associated with the clients;
    in response to identifying the training event:
      obtain raw training data associated with the clients;
      obtain processed training data using the raw training data;
      generate clustered training data using the processed training data; and
      generate a prediction model by applying the processed training data to a classification algorithm.

11. The system of claim 10, wherein the raw training data comprise training data obtained from at least two of the clients.

12. The system of claim 10, wherein the live data comprise second training data obtained from only the client.

13. The system of claim 10, wherein the raw training data comprise at least one selected from a group consisted of:
  the client configuration information features,
  the client upgrade history information features, and
  the upgrade failure history information features.

14. The system of claim 13, wherein generating the clustered training data comprises separating the processed training data into training data clusters, wherein a training data cluster of the training data clusters comprises at least one selected from a group consisting of:
  processed training data that comprise at least a portion of the same client configuration information features,
  processed training data that comprise at least a portion of the same client upgrade history information features, and
  processed training data that comprise at least a portion of the same upgrade failure history information features.

15. The system of claim 10, wherein the raw training data comprise more features than the relevant features.

16. The system of claim 9, wherein the action comprises notifying a user that user intervention will be required to resolve the upgrade failure.

17. A non-transitory computer readable medium comprising computer readable program code, which when executed by a computer processor enables the computer processor to perform a method for managing upgrades of components of clients, the method comprising:
  obtaining an upgrade failure prediction request associated with an upgrade of an upgrade type of upgrade types, wherein the upgrade types comprise:
    a software upgrade of a client software component of a client of clients, and
    a hardware upgrade of a client hardware component of the client;
  in response to obtaining an update failure prediction request:
    obtaining live data associated with the client;
    matching the live data with a training data cluster;
    selecting relevant features associated with processed training data of the training data cluster using a feature selection algorithm and the training data cluster, wherein:
      the processed training data comprises a plurality of features comprising client configuration information features, client upgrade history information features, and upgrade failure history information features;
      the feature selection algorithm selects and specifies the relevant features associated with the training data cluster based on Z-scores associated with the plurality of features; and
      the relevant features comprise a portion of the client configuration information features, a portion of the client upgrade history information features, and a portion of the upgrade failure history information features in the processed training data that are highly relevant to upgrade failure predictions;
    generating an upgrade failure prediction using the live data associated with the relevant features and a prediction model;
    making a determination that the upgrade failure prediction implicates an action is required; and
    based on the determination:
      initiating performance of the action, wherein the action comprises notifying a user that user intervention will be required to resolve the upgrade failure.

18. The non-transitory computer readable medium of claim 17, wherein the method further comprises:
  before obtaining the update failure prediction request:
    identifying a training event associated with the clients;
    in response to identifying the training event:
      obtaining raw training data associated with the clients, wherein the raw training data comprise at least one selected from a group consisted of: client configuration information features, client upgrade history information features, and upgrade failure history information features;
      obtaining processed training data using the raw training data;
      generating clustered training data using the processed training data; and
      generating a prediction model by applying the processed training data to a classification algorithm.

19. The non-transitory computer readable medium of claim 18, wherein the raw training data comprise training data obtained from at least two of the clients.

20. The non-transitory computer readable medium of claim 18, wherein generating the clustered training data comprises separating the processed training data into training data clusters, wherein a training data cluster of the training data clusters comprises at least one selected from a group consisting of:
- processed training data that comprise at least a portion of the same client configuration information features,
- processed training data that comprise at least a portion of the same client upgrade history information features, and
- processed training data that comprise at least a portion of the same upgrade failure history information features.

* * * * *